(12) United States Patent
Strzalkowski

(10) Patent No.: US 9,859,803 B2
(45) Date of Patent: Jan. 2, 2018

(54) TRANSFORMER-BASED ISOLATED BI-DIRECTIONAL DC-DC POWER CONVERTER, AND METHOD AND CONTROLLER FOR USING SAME

(71) Applicant: Analog Devices Global, Hamilton (BM)

(72) Inventor: Bernhard Strzalkowski, Munich (DE)

(73) Assignee: Analog Devices Global, Hamilton (BM)

( * ) Notice: Subject to any disclaimer, the term of this patent is extended or adjusted under 35 U.S.C. 154(b) by 63 days.

(21) Appl. No.: 13/868,459

(22) Filed: Apr. 23, 2013

(65) Prior Publication Data

US 2014/0313784 A1    Oct. 23, 2014

(51) Int. Cl.
*H02M 3/335*    (2006.01)
(52) U.S. Cl.
CPC ............................... *H02M 3/33584* (2013.01)
(58) Field of Classification Search
CPC ............... H02M 33/88; H02M 3/3376; H02M 2001/0032
USPC ..... 363/15–17, 24–26, 40–41, 56.02, 97–98, 363/123, 131–132, 21.01–21.18
See application file for complete search history.

(56) References Cited

U.S. PATENT DOCUMENTS

| | | | | | |
|---|---|---|---|---|---|
| 5,343,079 | A | * | 8/1994 | Mohan ..................... | H02J 9/062 307/105 |
| 5,621,625 | A | * | 4/1997 | Bang ........................ | H02M 1/32 363/21.1 |
| 5,623,397 | A | * | 4/1997 | Vinciarelli ........ | H02M 3/33576 363/16 |
| 6,069,804 | A | * | 5/2000 | Ingman .................. | H02J 7/0068 363/124 |
| 6,330,170 | B1 | * | 12/2001 | Wang ....................... | H02J 9/062 363/17 |
| 6,587,356 | B2 | * | 7/2003 | Zhu .......................... | H02M 1/34 323/908 |
| 7,643,321 | B2 | * | 1/2010 | Chen ..................... | H02M 7/797 363/95 |
| 8,767,867 | B1 | * | 7/2014 | Castor-Perry ........... | H04L 27/12 363/21.1 |
| 2002/0140403 | A1 | * | 10/2002 | Reddy ........................... | 320/162 |
| 2002/0172061 | A1 | * | 11/2002 | Phadke .................... | H02M 1/38 363/127 |
| 2003/0063478 | A1 | * | 4/2003 | Beranger .................. | H04B 3/54 363/21.07 |
| 2003/0067794 | A1 | * | 4/2003 | Boylan ............. | H02M 3/33592 363/127 |
| 2005/0201124 | A1 | * | 9/2005 | Lanni ................... | H02M 1/4208 363/16 |

(Continued)

*Primary Examiner* — Yusef Ahmed
(74) *Attorney, Agent, or Firm* — Schwegman Lundberg & Woessner, P.A.

(57) ABSTRACT

A transformer based isolated bi-directional DC-DC power converter may have signals for controlling power transfer in first and second directions are derived from the same side of the transformer. The converter may include a transformer, a first switching circuit, a second switching circuit, and a controller. In a first mode, the controller controls the first and second switching circuits, and power is transferred from a first side to a second side. In a second mode, the controller controls the first and second switching circuits, and power is transferred from the second side to the first side.

7 Claims, 5 Drawing Sheets

(56) References Cited

U.S. PATENT DOCUMENTS

| | | | |
|---|---|---|---|
| 2008/0130322 A1* | 6/2008 | Artusi | H02M 1/4225 |
| | | | 363/21.01 |
| 2008/0198631 A1* | 8/2008 | Zeng et al. | 363/17 |
| 2010/0177536 A1* | 7/2010 | Liu | H02M 3/33592 |
| | | | 363/17 |
| 2011/0149611 A1* | 6/2011 | Moussaoui et al. | 363/21.04 |
| 2011/0188267 A1* | 8/2011 | Lai | H02M 3/335 |
| | | | 363/17 |
| 2011/0317452 A1* | 12/2011 | Anguelov | H02M 3/33584 |
| | | | 363/21.02 |
| 2012/0112547 A1* | 5/2012 | Ghosh | H02J 9/062 |
| | | | 307/66 |
| 2012/0250369 A1* | 10/2012 | Furukawa | H02M 3/33584 |
| | | | 363/25 |
| 2013/0039104 A1* | 2/2013 | Sharma | H02M 1/10 |
| | | | 363/123 |
| 2013/0044519 A1* | 2/2013 | Teraura | H02M 3/33584 |
| | | | 363/17 |
| 2013/0051083 A1* | 2/2013 | Zhao | H02J 5/005 |
| | | | 363/17 |
| 2013/0057200 A1* | 3/2013 | Potts et al. | 320/107 |
| 2013/0119875 A1* | 5/2013 | Dearborn | H05B 33/0815 |
| | | | 315/186 |
| 2014/0003095 A1* | 1/2014 | Thomas | H02M 3/33584 |
| | | | 363/21.04 |
| 2014/0104890 A1* | 4/2014 | Matsubara | H02M 3/33584 |
| | | | 363/17 |
| 2014/0192565 A1* | 7/2014 | Wang | H02M 3/33592 |
| | | | 363/21.14 |
| 2015/0124490 A1* | 5/2015 | Sanuki | H02M 3/33546 |
| | | | 363/17 |

* cited by examiner

TRANSFORMER-BASED ISOLATED BI-DIRECTIONAL DC-DC POWER CONVERTER, AND METHOD AND CONTROLLER FOR USING SAME

BACKGROUND

Bi-directional DC-DC power converters have become important components in, for example, electric and hybrid automobiles, elevators, battery charging and smart grid power systems. Bi-directional isolated DC to DC converters can transfer power in a first direction, which may be known as a forward direction, (for example from a battery to a motor) and in a second direction, which may be known as a reverse direction (for example when returning power to the battery). Known bi-directional isolated power converters require two feedback signals to manage the bi-directional power flow, namely a first signal from the primary side of the isolation barrier, and a second from the secondary side of the isolation barrier. At least one of the feedback signals has to be transferred across the isolation barrier to a controller positioned on one side of the isolation barrier, requiring additional signal transmission circuitry. Such circuitry may include an isolated amplifier, a reference voltage generator, a comparator and an optocoupler. These components may introduce delay, limit bandwidth and increase errors due to temperature drift, not to mention the additional cost incurred and space taken up on-chip by such devices.

SUMMARY

According to an aspect there is provided a transformer based isolated bi-directional DC-DC converter in which signals for controlling both forward and reverse power transfer are derived from the same side of the transformer.

Accordingly, a bi-directional DC-DC converter can be controlled from a controller implemented on a single side of the isolation barrier, regardless of the direction of power transfer across the transformer and without the requirement to feedback either of the forward and reverse output voltages across the isolation barrier. This removes the requirement for additional circuitry associated with prior art bi-directional DC-DC voltage converters which require an output voltage to be feedback across the isolation barrier.

In an embodiment there is provided an isolated bi-directional DC-DC converter comprising: a transformer having a first winding on a first side of an isolation barrier and a second winding on a second side of the isolation barrier; a first switching circuit coupled to the first winding; a second switching circuit coupled to the second winding; and a controller for controlling the first and second switching circuits; wherein, in a first mode in which power is transferred from the first side to the second side, the controller controls at least the first switching circuit based on the output of the second switching circuit, and wherein, in a second mode in which power is transferred from the second side to the first side, the controller controls at least the second switching circuit based on a voltage at the second winding. In this context "isolated" refers to the absence of a direct conduction path across the power converter.

The first and second switching circuits may each comprise one or more actively controlled switches. Thus the switching circuits may be controlled so as to perform synchronous rectification. In the first mode the first switching circuit may be controlled by the controller to modulate the power being transferred across the transformer while the controller operates the second switching circuit as a rectifier. Similarly in the second mode the switches of the second switching circuit may be controlled so as to control the build and decay of current in an inductor associated with the second switching circuit and current flow in the second winding, and the switches of the first switching circuit may be controlled to perform synchronous rectification. Thus, conduction losses associated with passive rectifiers can be greatly reduced. Moreover, power transfer across the transformer can be accurately controlled by appropriate operation of the switches.

The first switching circuit may have a first input/output node for connection to a device such as a power source, e.g. a battery or a power grid. The second switching circuit may have a second input/output node for connection to a load such as a motor.

One or both of the first and second switching circuits may comprise a half bridge, a full bridge and/or a push-pull converter or any other suitable topology for cooperating with the transformer for converting one DC voltage to another DC voltage.

The bi-directional DC-DC converter may further comprise a sampling circuit operable in the second mode to sample a voltage at the second winding. The circuit may be operable to sample the input, such as an input voltage, at the second winding in synchrony with switching of one or more of the switches of the first or second switching circuits. Thus, a voltage representative of the output voltage at the first node on the first side of the isolation barrier may be estimated from a voltage measurement made on the second side of the isolation barrier. The sampled voltage at an input/output node of the second winding may be compared with a first reference voltage, which may be representative of a second mode target voltage at the first input/output node of the first side of the bi-directional converter. The result of the comparison may be used to control the operation of the first and second switching circuits to cause the voltage at the first input/output node to achieve a target value. The control may comprise adjusting one or more of an operating frequency, duty cycle or relative phase of the switching circuits.

In the first mode the controller may compare the output voltage of the second switching circuit with a reference voltage. The reference voltage may be representative of a first mode target voltage at the second input/output node of the bi-directional converter.

The controller may comprise circuits responsive to voltages at a terminal or node of the second winding of the transformer, at the input/output node of the second switching circuit, or to a rectified version of a voltage output from the second winding of the transformer. These voltages may in an embodiment, be operated on by an analogue-to-digital converter (ADC) operable to generate a digital representation of the input at the second winding and/or the output of the second switching circuit.

The sampled voltage at an input/output node of the second winding may be compared with the voltage at the second input/output node of the second switching circuit. The result of the comparison may be used to choose either the first or the second control mode. The result of the comparison can be used to establish the phase shift value between the waveforms used to control switching of the switches within the first and the second switching circuits, when the both switching circuits are working with the same frequency and, for example, with a duty ratio of 50%.

The controller may further comprise a switch control circuit, for example provided as a digital pulse width modulator (DPWM) operable to drive one or more of the actively controlled switches of the first and second switching circuits. The DPWM is preferably isolated from the switches of the first switching circuit. The isolation may be provided by any suitable isolation structure that can transmit the digital control signals required by the switches.

According to an aspect there is provided a method of controlling a bi-directional DC-DC converter, comprising: in a first mode, in which power is transferred from a first side to a second side of an isolation barrier, deriving a first mode output voltage on the second side based on a first voltage at a first node located on the second side of the isolation barrier; and in a second mode, in which power is transferred from the second side to the first side of the isolation barrier, deriving a second mode output voltage on the first side based on a second voltage occurring at a second node on the second side of the isolation barrier.

BRIEF DESCRIPTION OF THE DRAWINGS

Embodiments of a bidirectional DC-DC converter will now be described, by way of non-limiting example only, with reference to the accompanying drawings, in which.

DESCRIPTION OF EMBODIMENTS

High power and wide load range isolated bi-directional DC-DC power converters have become important in electric and hybrid automobiles, elevators, battery charging and smart grid power systems. Such converters are designed to be operable both in a standard forward mode in which, for example, a battery drives the motor of an electric vehicle, and in a reverse mode in which power is transferred in an opposite direction to that of the forward mode, for example, where an electric vehicle's motors are engaged as generators so as to harvest kinetic energy from the vehicle whilst inducing a braking force on the vehicle's wheels—so called regenerative braking.

Modern DC-DC converters tend to utilize digital control methods because of the associated programmability of features which cannot be offered by classical analogue techniques. Digital power controllers offer high accuracy and efficiency, and allow a power supply to be operated in multiple modes, for example forward, backward, low power and high power modes. This is in contrast to analogue control loops which traditionally can only be operated in a single mode. However, most present day analogue or digital isolated bi-directional converters require optocouplers to transmit analogue signals across their isolation barriers. Optocouplers limit the advantages and performance of digital power controllers due to the unintentional feedback loop gain variation, temperature drift and ageing effects of light emitting diodes (LEDs) used in the optocouplers. Embodiments described in this disclosure present new approaches to the design of bi-directional DC-DC power converters. Such converters can have the entirety of the controller implemented on one side of the isolation barrier so that the requirement to pass information concerning an analogue variable over the isolation barrier is removed.

Figure 1:
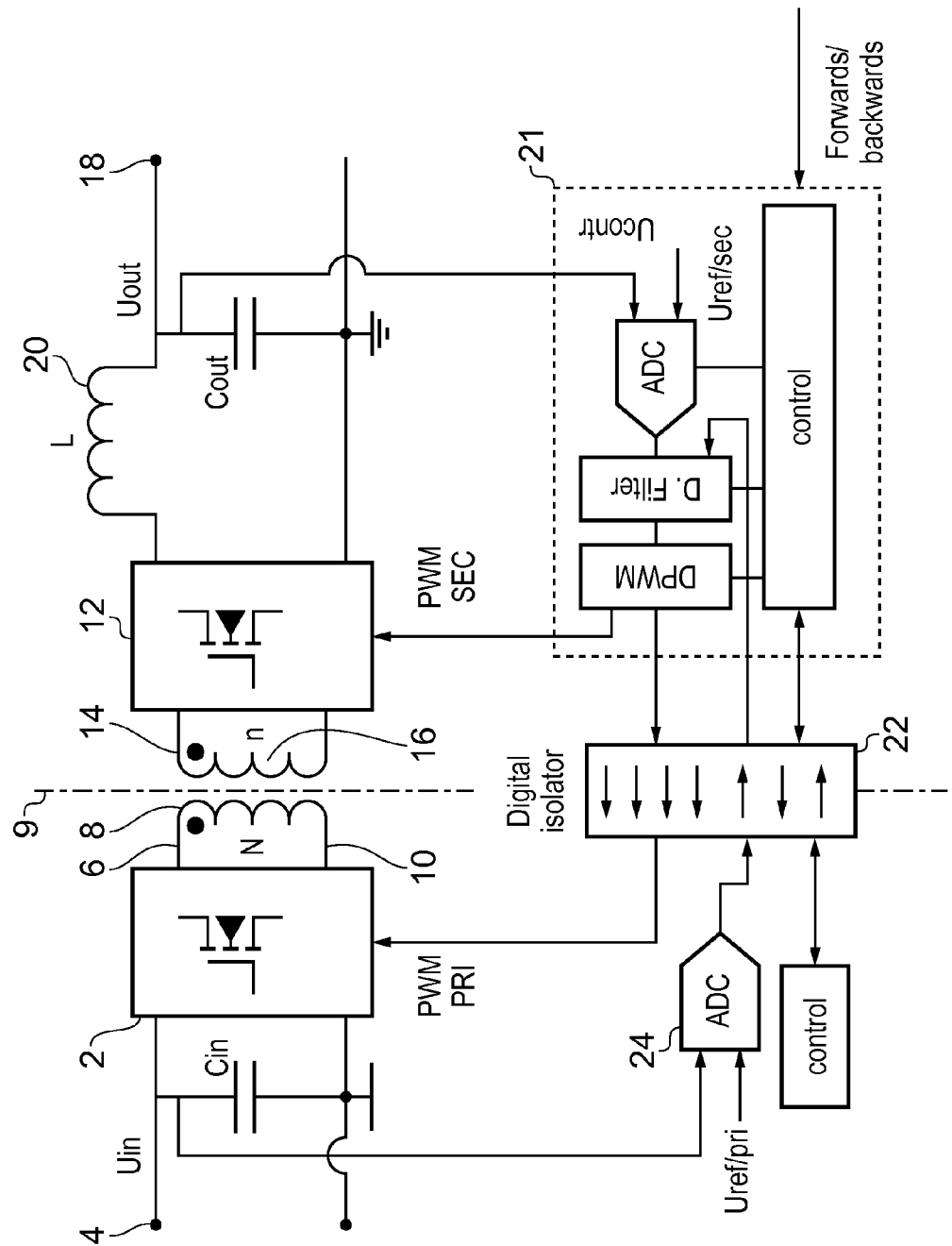
FIG. 1 is a schematic diagram of a state of the art isolated bi-directional DC-DC power converter.

FIG. 1 illustrates a circuit topology exemplary of existing high-power bi-directional DC-DC converters. The circuit comprises a first switching circuit 2 which is connected between a first input/output node 4 and a first node 6 of a first or primary winding 8 of a transformer which forms an isolation barrier 9. A second node 10 of the primary winding 8 of the transformer is also connected to the switching circuit 2. In use the switching circuit 2 may be driven to act as a voltage-fed converter to transfer power form the primary side to the secondary side of the isolation barrier. The circuit further comprises a second switching circuit 12 connected between a first node 14 of a second or secondary winding 16 of the transformer. The second switching circuit 12 is connected to a second input/output node 18 by way of an inductor 20. In use, when transferring power from the secondary side of the isolation barrier to the primary side, the second switching circuit 12 may be driven in a current-fed manner. Each switching circuit 2 and 12 may be a full-bridge, a half-bridge, or a push-pull rectifier, or any variation thereof. Each switching circuit 2, 12 may comprise one or more actively controlled transistor switches. Such topologies are commonly controlled using pulse width modulation (PWM) of the active switches.

Because of the bi-directional nature of convertors such as that shown in FIG. 1, feedback from the input/output node 4 of the primary switching circuit 2 and the input/output node 18 of the secondary switching circuit 12 is required to control the switching circuits in order to maintain accurate output voltages in both forward and reverse modes of operation. In the illustrated example, a single controller 21 is located on the secondary side of the isolation barrier 9. The single controller 21 controls both the first and second switching circuits. Accordingly, information concerning the voltage at the input/output node 4 of the primary side of the converter must be transmitted over the isolation barrier to the controller 21 to provide an error signal for use in a feedback control loop, using an isolator 22, such as an optocoupler. This requires forming a representation of the voltage at the input/output node 4 using an analogue to digital converter 24 provided on the primary side and transferring the representation to the controller via the isolator 22. Control signals for active switches in the first switching circuit also pass through the isolator 22.

Figure 2:
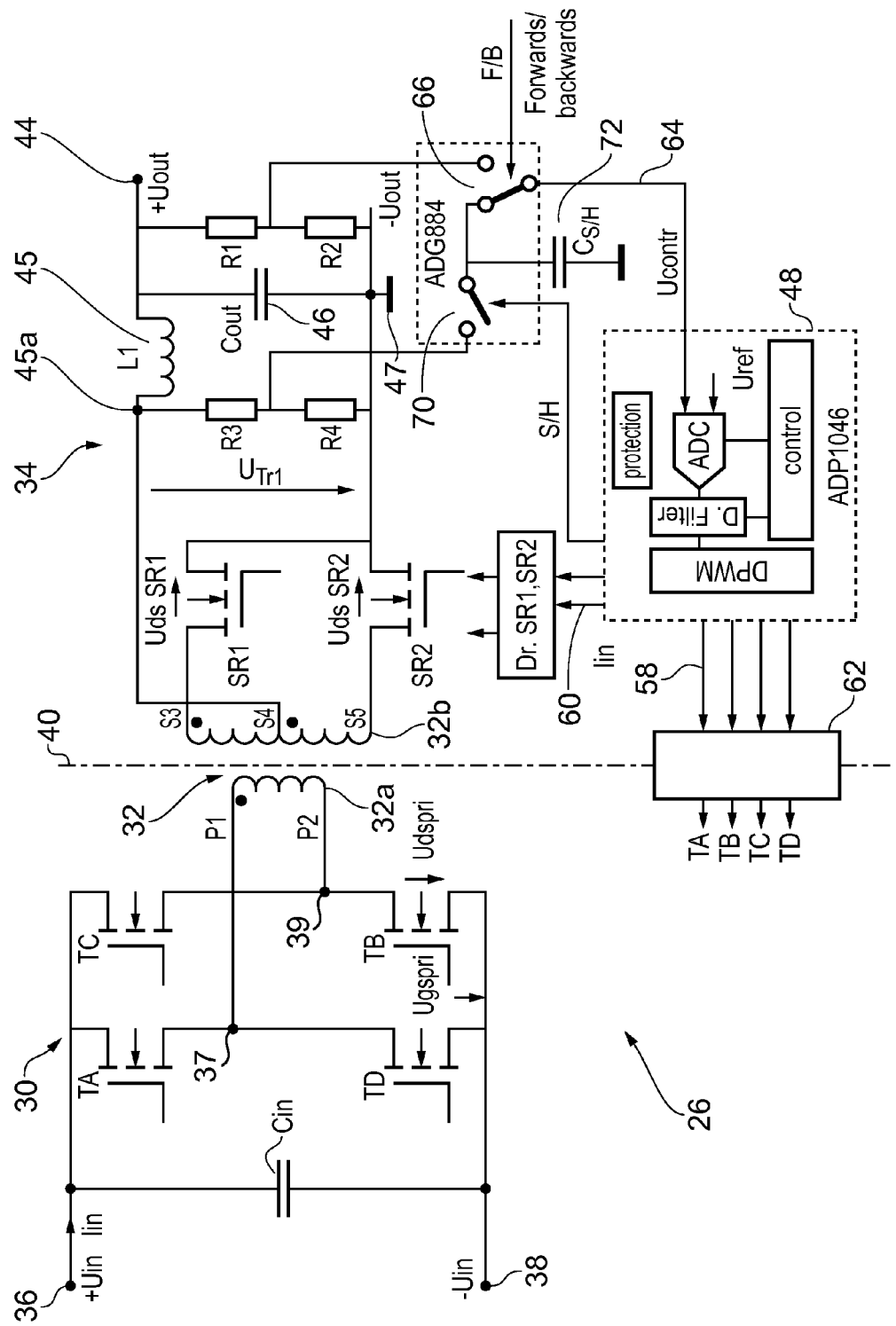
FIG. 2 is a schematic diagram of a bi-directional DC-DC voltage converter.

FIG. 2 shows a bidirectional DC-DC converter 26 implemented using a novel feedback and control regime. The converter 26 comprises, on a primary side of an isolation barrier 40, a first switching circuit 30 and on a secondary side, a second switching circuit 34. The first switching circuit 30 comprises four transistor switches, TA, TB, TC and TD, arranged in a full-bridge configuration in which transistors TA and TD are connected in series between the first input/output node 36 and a primary side ground 38 with their common node 37 connected to a first terminal P1 of a first winding 32a of a transformer 32. Similarly, transistors TC and TB are connected in series between the input/output node 36 and ground 38, their connected terminals forming a node 39 coupled to a second terminal P2 of the first winding 32a. The input/output node 36 and ground 38 may be connected via an input capacitor Cin.

On the second side of the isolation barrier 40 is a second winding 32b of the transformer 32. The second winding has a centre tap forming a node S4 coupled to the second input/output node 44 of the secondary side of the converter via an inductor 45. The second switching circuit 34 comprises two transistor switches SR1 and SR2. The source of each switch SR1, SR2 is connected to respective first and second end terminals, S3 and S5, of the transformer winding 32b on either side of the central tap S4. The drains of transistor switch SR1 and transistor switch SR2 are connected to a local ground 47. A smoothing/reservoir capacitor 46 having capacitance Cout is coupled between the input/output node 44 and the local ground 47.

The converter configuration shown in FIG. 2 is an efficient and cost effective topology. However, whilst embodiments are described with reference to this circuit, it will be appreciated that full-bridge and push-pull circuit topologies may be replaced by any variations of suitable switching circuits known in the art. Selection of switching circuits may depend on, for example, converter application, required efficiency, cost and/or location of the converter.

As with the prior art controller shown in FIG. 1, in embodiment shown in FIG. 2 has a single controller 48 provided on the secondary side of the voltage converter 26. The controller 48 is arranged to monitor the output voltage at the second side of the converter at node 44 in a forward mode when energy is being supplied from a battery. In addition, the controller is also arranged to monitor the output of the first side of the converter when the converter is operating in a reverse mode. However, in contrast to the prior art, there are no monitoring components attached to the first input/output node 36. Instead, in the reverse mode, the output node 36 voltage is measured indirectly as a function of the input voltage Utr1 at node S4 of the second winding 32b of the transformer 32. This has the advantage of being able to use a single ADC within the controller 48 for both forward and reverse power transfer. It also means that the same ADC can be used irrespective of the voltage at the input/output node 36. The additional expense of providing an ADC on the primary side of the isolation barrier, and providing a data connection from the ADC to the controller via a isolation channel specifically for such data transfer is therefore avoided. Thus for a controller implemented in an integrated circuit package, the pin out requirements and hence package cost can be reduced, and/or pins are made available for other functions.

Figure 3:
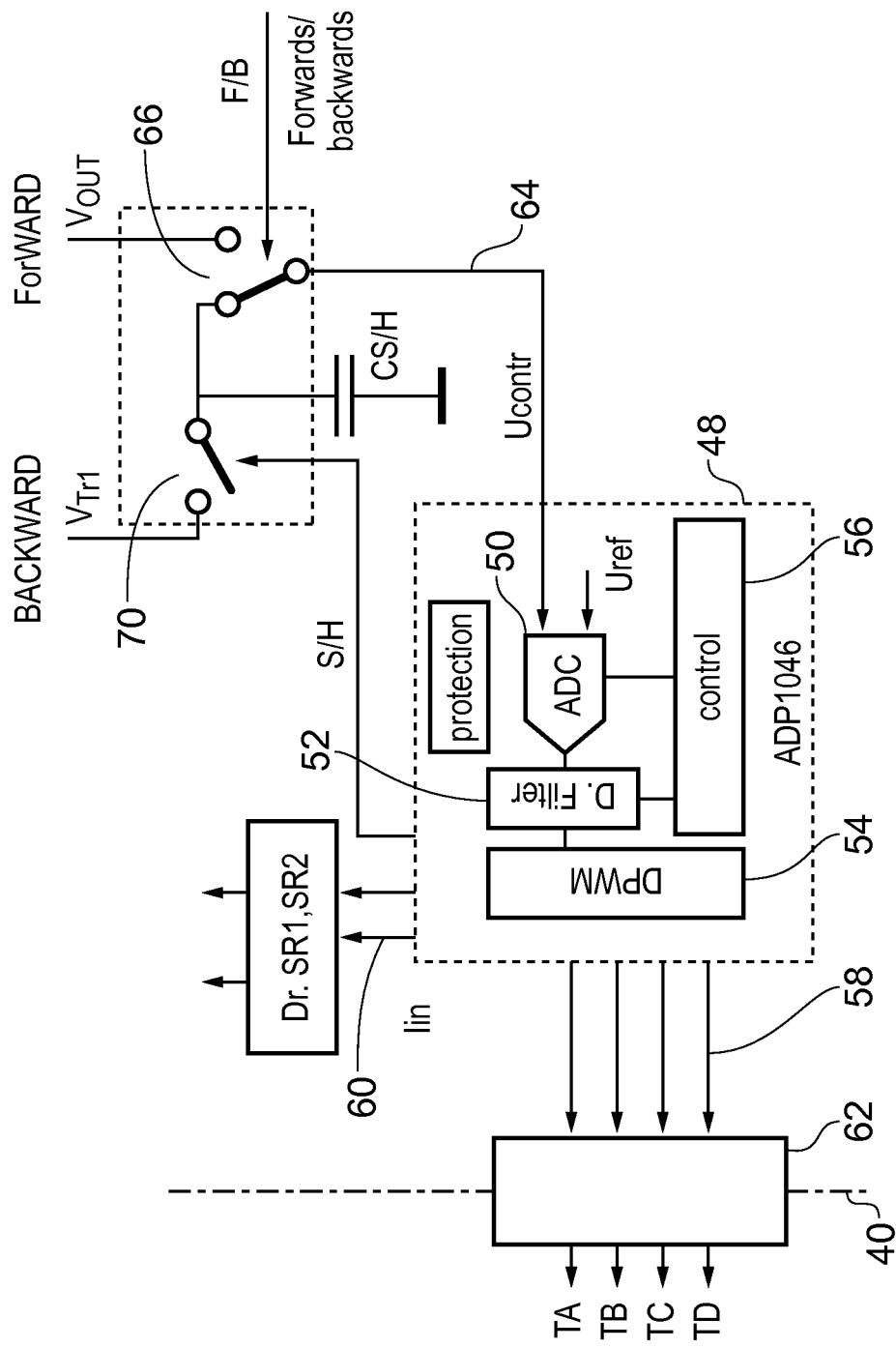
FIG. 3 is a schematic diagram of the control circuit of the bi-directional DC-DC voltage converter of FIG. 2.

The controller 48 is shown in more detail in FIG. 3. Referring to both FIGS. 2 and 3, the controller (in this example) comprises an analogue to digital converter (ADC) 50, optionally a digital filter 52 which may act to modify the time domain response of the control circuit, so for example to render it substantially non-responsive to high frequency or transient signals, and a digital pulse width modulator (DPWM) 54 responsive to the output of the ADC, together with control circuitry 56. Outputs from the DPWM 54 may be transferred via first and second buses 58, 60 to one or more of the active switches of the first and second switching circuits 30 and 34. A digital isolator 62 is positioned in the path of the primary switching bus 58 to transfer switching signals from the controller 48 on the secondary side to the active switches TA, TB, TC, TD of the first switching circuit 30 on the primary side of the isolation barrier 40. The isolation barrier 62 prevents DC voltages propagating from the primary side to the DC-DC converter, for example as might occur due to a cabling fault in an automotive environment. The isolation barrier 62 may comprise optocouplers, capacitive coupling, and/or transformer coupling, all optionally with circuits for encoding and decoding pulses across the isolation barrier such that the control signals can be faithfully reconstructed and applied to the gates of the switches TA, TB, TC, TD.

As with the converter of FIG. 1, the bidirectional DC-DC converter 26 is operable to transfer power across the transformer 32 both in a forward mode, in which power is transferred from the primary side to the secondary side of the isolation barrier 40, and in a reverse mode in which power is transferred from the secondary side to the primary side.

During the forward mode of operation, in which power is being transferred from the first winding 32a to the second winding 32b of the transformer 32, the controller 48 is adapted to monitor the voltage at the second input/output node 44 of the secondary side such that power transfer across the transformer can be controlled and managed. In such circumstances, the input/output node 44 may be coupled to an input of the ADC 50. This coupling may be selective, with use of a selector switch 66. The output node 44 may be coupled to the ADC 50 via an optional potential divider comprising resistors R1 and R2 to an input of the ADC 50. The potential divider may be optional, but where provided it may have the advantage of scaling the voltage from node 44 to a convenient point, such as mid scale, in the ADC converter's operating range. The selector switch 66 may operate as a result of user input (thus in an automotive system it may operate in one mode when the accelerator is depressed and the other mode when the accelerator is not depressed or the brake is applied)—or automatically by monitoring the direction of current flow at a motor or other reactive load, or by comparing the voltage at node S4 with the voltage at node 44. Thus the ADC 50 may be operated in a time multiplexed mode. At the ADC 50, the voltage at the input/output node 44 is measured with respect to a reference voltage Uref. The digital result of this measurement is passed to the DPWM 54 via the optional digital filter 52. The digital result may represent an error between the target output voltage (set by Uref) and the actual output voltage at the output node 44. This error signal may then be used to alter the switching of the transistor switches TA, TB, TC, TD in both the first and second switching circuits 30, 34, as is known in the art for unidirectional pulse width modulated DC voltage converters.

In reverse mode, where power is being transferred from the secondary side to the primary side of the converter 26, the second switching circuit 34 of the converter 26 is preferably (though not necessarily) operated in a current-fed boost mode. This is because the current carrying inductor 45 is serially connected to the power transformer 32 and to the active switches SR1, SR2 of the push-pull rectifier formed by the second switching circuit 34.

The switches SR1, SR2 of the switching circuit 34 may be controlled to switch on alternately, such that either one or the other switch is conducting at a given time. In some embodiments, there may be a switch-on overlap between the switches SR1 and SR2, during which both switches SR1, SR2 are conducting simultaneously. The magnetic flux from the top half of the secondary winding is in opposition to the flux from the bottom half of the secondary winding. Thus to a first approximation the transformer is largely non functional under these conditions and hence it appears as if the first node 45a of the inductor 45 is connected to ground. As a result current will build in the inductor according to the equation:

$$\frac{di}{dt} = \frac{V}{L}$$

where V is the voltage at node 44 and L is the inductance of the inductor 45.

The period of the switch-on overlap may therefore determine the inductor current, and hence the amount of energy of the input current at the (now) input node 44 to be transferred across the transformer 32.

Once current has built to a sufficient level, one or other of the transistors SR1 and SR2 may be made non conducting, thereby causing the magnetic flux established by current flow in only one half of the secondary winding to transfer power to the primary winding. Where the switches are driven to conduct in an alternating fashion the transfer of power across each half (S3 to S4 or S4 to S5) of the secondary winding will alternate.

Once the energy from the inductor has been transferred, the cycle may be repeated, and once the current has built the one (either the same one of the other one) of the transistors SR1 and SR2 may be made non conducting again. The strategies for controlling the time that the switches SR1 and SR2 are conducting (either mutually or one at a time) in order to build current in the inductor and to transfer power via the transformer 32 are known to those skilled in the art.

On the primary side, a voltage is induced on the primary winding. The primary switching circuit 30 may act as a full-wave rectifier, utilising either the passive body diodes of the transistor switches TA, TB, TC, TD or active control by PWM to convert the output AC voltage of the primary winding 32a to a DC output voltage at node 36.

In order to control the switch-on overlap of the switches SR1, SR2 of the push-pull rectifier 34, it is desirable to know the output voltage at input/output node 36. Instead of directly monitoring the input/output node 36 and feeding back the result via the isolation barrier 40, the voltage at the node 36 is indirectly extracted by measuring the voltage at the input of the secondary winding 32b. To do so, the selection switch 66 may be switched to couple the central tap S4 of the secondary winding 32b to the ADC 50, optionally via a divider comprising resistors R3 and R4 which, where provided, acts to scale the voltage at node S4 to a convenient point for input into the ADC 50. Thus, the voltage Uin at the input/output node 36 on the primary side is estimated as a function of the winding ratio of the transformer 32, in accordance with the following equation.

$$Utr1 = Uin \frac{N_{S3S4}}{N_{P1P2}}$$

where Utr1 is the voltage on the secondary winding between the centre tap S4 and one end S3 of the secondary winding 32b, $N_{S3S4}$ is the number of turns on the secondary side between the centre tap S4 and one end S3 of the secondary winding (the secondary is preferably symmetrical about the centre tap) and $N_{P1P2}$ is the number of turns of the primary winding.

The voltage at the input/output node 36 of the primary side is most accurately represented by the voltage Utr1 at the central tap S4 of the secondary winding 32b when the energy induced by inductor 45 is being transferred to the primary side via transformer 32. Accordingly, a sample and hold or a track and hold circuit may be used to obtain a value of the input voltage at the central tap S4 of the secondary winding during energy transfer. Such a measurement may be taken just after one of other of SR1 and SR2 has been made conducting. The sample and track (or sample and hold S/H) circuit may comprise a sample switch 70 and sample capacitor 72 positioned between the node S4 of the secondary winding 32b and the input 64 of the ADC 50. The sample switch 70 may be controlled by the controller 48. In alternative embodiments, where less accurate monitoring of the voltage at node 36 is required, the sample and track circuit may be replaced with an RC filter (possibly in combination with a diode so as to form a peak detector) operable to provide a representative value such as the mean or peak value of Utr1 to the input of the ADC 50. Other suitable methods of monitoring the input voltage at the secondary winding are known in the art.

Figure 4:
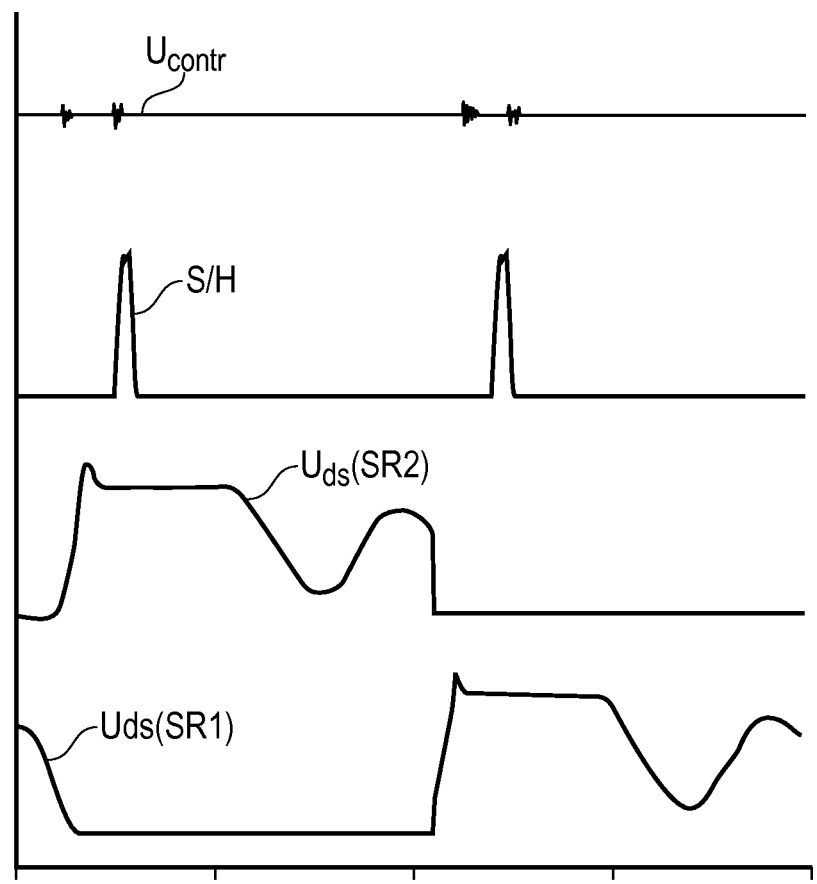
FIG. 4 is a graphical illustration of various control and output signals of the bi-directional DC-DC power converter of FIG. 2.

The control signal "S/H" for operating the sample and hold circuit is preferably generated internally at the controller 48. In order to increase the control loop accuracy and the step-load response time a double update rate of the S/H control signal may be used. In other words, the input of the secondary winding may be sampled at double the frequency of the voltage at Utr1. In order to generate the control signal S/H, the controller 48 may comprise a pattern generator to allow precise timing of the S/H control signal. FIG. 4 shows an example voltage versus time waveform for drain-source voltages of both switches SR1 and SR2, the S/H control voltage as well as the feedback loop control voltage Ucontr provided to the ADC 50. The switches SR1, SR2 of the second switching circuit 34 are switched on alternately with an overlap of a few tens of nanoseconds around time "A" when both switches SR1, SR2 are on. The switching frequency of switches SR1 and SR2 determines the frequency of the input voltage Utr1 at the secondary winding 32b.

As mentioned previously, during a switch-on overlap period, during which both switches SR1 and SR2 are switched on simultaneously, energy is drawn from the reservoir capacitor 46 and stored in the inductor 45. Thus, the stored energy in the inductor 45 determines the average reverse power level of the bidirectional converter. As such, an increase in switch-on overlap period increases the average power transferred across the transformer 32. In accordance with the double update rate sample regime, the S/H signal is preferably triggered once in the period in which the transistor SR2 is switched on with a stable drain source voltage, and once when the transistor SR1 is switched on with its drain source voltage stable, thus sampling Utr1 during peak transfer from the inductor 45 to the coil 32.

The tracked or sampled voltage Utr1 may then be compared with a reference voltage Uref. The digital result of the comparison, which may be a signed voltage error signal, may then be passed from the ADC 50 via optional digital filter 52 to the DPWM 54 which may then output PWM signals to switches SR1 and SR2 operable to control power transfer across the transformer 32. In addition, the output of the primary winding 32a may be synchronously rectified by the primary converter 30, the switches therein receiving PWM signals from the DPWM via the digital isolator 62. Alternatively, the primary converter 30 may be operated passively using intrinsic body diodes of the switches TA, TB, TC, TD. It will, however, be appreciated that the use of synchronous rectification significantly reduces conduction losses in comparison to passive configurations.

Figure 5:
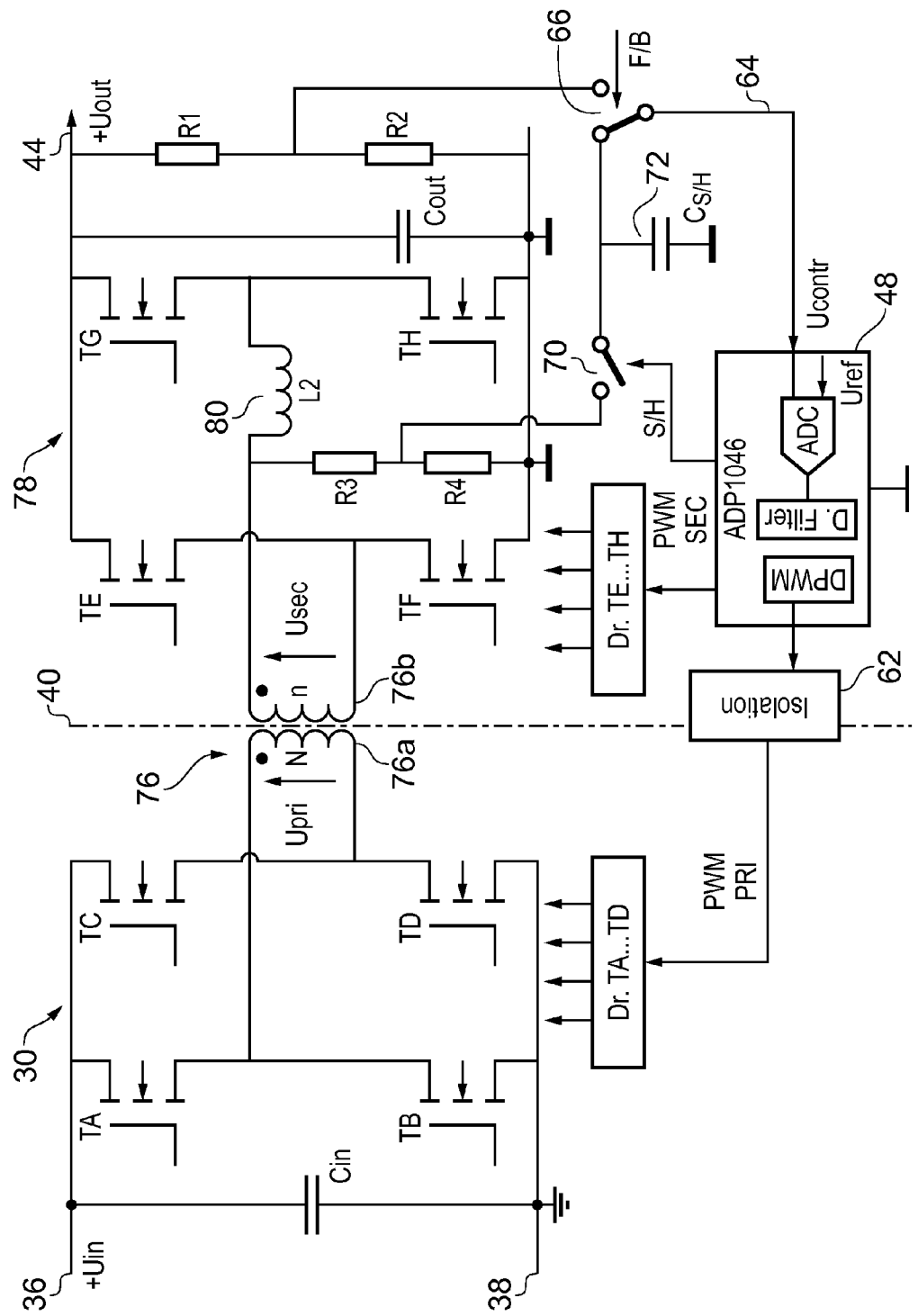
FIG. 5 is a schematic diagram of a bi-directional DC-DC power converter.

As mentioned previously the full-bridge primary converter 30 in conjunction with the central tapped transformer and push-pull rectifier 34 is an efficient and cost effective topology for modern high power bidirectional DC-DC converters. However, it will be appreciated that other rectifying topologies may be used for either of the first or second converters 30, 34. FIG. 5 illustrates a variation of the bidirectional DC-DC converter 26 shown in FIG. 2, where like parts are given like numbering. On a primary side of the converter, the same switching circuit 30 of FIG. 2 is provided coupled to a primary winding 76a of a regular (non central tapped) transformer 76. On a secondary side of the isolation barrier 40, however, in place of the push-pull rectifier 34 of FIG. 2, there is provided a second full-bridge rectifier generally designated 78 comprising transistor switches TE, TF, TG and TH, together with a current inductor 80.

The bidirectional converter of FIG. 5 operates in a similar manner to that of the converter 26 in FIG. 2. However, in the reverse mode with power being transferred from the secondary winding 76*b* to the primary winding 76*a* of the transformer 76, transistor switches TE to TH of the full-bridge rectifier 78 are switched using a PWM regime by the controller 48 to control the amount of power being transferred across the transformer to the primary side. Equally, in the forward mode the full-bridge converter 78 on the secondary side acts as a full wave rectifier either passively using body diodes, or actively with control from the controller 48. As is the case with the converter 26, in reverse mode, the output voltage Uin at node 26 is indirectly determined by monitoring the voltage at the input of the secondary winding 76*b* using either the sample switch 70 and sample capacitor 72 shown in FIG. 5, or an RC circuit to calculate a representative value of the input voltage at the secondary winding 76*b* of the transformer 76, or any other suitable method known in the art. Accordingly, the embodiments shown and variations thereof remove the need for additional ADCs on the primary side together with additional complex digital isolation circuitry previously required to provide feedback voltage signals from a primary side to a controller positioned on a secondary side of an isolated bi-directional DC-DC voltage converter.

The switching signals used to control the switches may be signals having rapid transitions, or the transitions may be "softened" such that a small portion of the energy of the inductor or resulting from leakage in the transformer may be used for resonant charging and discharging of drain-source capacitance when the switched as implemented as MOSFET devices, or for charging and discharging of collector-emitter capacitances where the switches are implemented using bipolar transistors.

The converter may also be operated in a phase controlled manner where each of the switching circuits is operated as a chopper/rectifier with a nominal 50% duty cycle. The phase difference between the first and second switching circuits may be adjusted to control the direction of power flow.

The disclosure has been made herein in terms of individual embodiments. However, those skilled in the art will appreciate that various embodiments, or features from one or more embodiments, may be combined as required. It will also be appreciated that various modifications may be made to these embodiments. The claims presented herewith have been drafted using single dependencies for first filing at the USPTO. However it is to be understood that the subject matter of any claim may be combined with that of any preceding claim of the same category except where such a combination is clearly infeasible.

The invention claimed is:

1. A bi-directional DC-DC power converter comprising:
   an isolation barrier configured to provide electrical isolation between a first side of the bidirectional DC-DC power converter and a second side of the bi-directional DC-DC power converter;
   a first switching circuit located on a first side of the isolation barrier;
   a second switching circuit located on a second side of the isolation barrier;
   a controller, electrically coupled to the second side of the isolation barrier and electrically isolated from the first side of the isolation barrier, for controlling one or more of the first and second switching circuits, wherein, in a first mode in which power is transferred from the first side of the bidirectional DC-DC power converter to the second side of the bidirectional DC-DC power converter, the controller controls one or both of the first and second switching circuits based at least partially on an output of the second switching circuit, and wherein, in a second mode in which power is transferred from the second side of the bidirectional DC-DC power converter to the first side of the bidirectional DC-DC power converter, the controller controls one or both of the first and second switching circuits based at least partially on an input voltage of the second side of the bidirectional DC-DC power converter;
   a selector switch, wherein a transformer of the bidirectional DC-DC power converter operates in one of the first mode and the second mode based on a state of the selector switch; and
   an analog-to-digital converter (ADC), electrically coupled to the second side of the isolation barrier and electrically isolated from the first side of the isolation barrier, operable to generate a digital representation of the output of the second switching circuit in the first mode and a digital representation of the input voltage of the second side of the bidirectional DC-DC power converter in the second mode;
   wherein the transformer of the bidirectional DC-DC power converter includes a first winding on the first side of the isolation barrier and a second winding on the second side of the isolation barrier, the first switching circuit configured to couple to the first winding, and the second switching circuit configured to coupe to the second winding; and
   wherein,
      in the first mode, the output of the second switching circuit is coupled to an input of the analog-to-digital converter via a first state of the selector switch, and
      in the second mode, an input of the second winding of the transformer of the bidirectional DC-DC power converter is coupled to the input of the analog-to-digital converter via a second state of the selector switch.

2. The bi-directional DC-DC power converter as claimed in claim 1, wherein the transformer of the bidirectional DC-DC power converter operates as a forward power converter in the first mode and a backwards power converter in the second mode.

3. The bi-directional DC-DC power converter as claimed in claim 2, wherein (i) in the first mode, the bi-directional DC-DC power converter operates as a voltage-fed converter and (ii) in the second mode, the bi-directional DC-DC power converter operates as a current-fed converter.

4. The bi-directional DC-DC power converter as claimed in claim 1, in which the controller is responsive to a voltage at the input of the second winding of the transformer of the bidirectional DC-DC power converter to estimate a voltage at an input/output node of the first switching circuit.

5. The bi-directional DC-DC power converter as claimed in claim 1, further comprising:
   a sampling circuit, wherein the sampling circuit (i) is operable in the second mode and (ii) samples a voltage at the input of the second winding.

6. The bi-directional DC-DC power converter as claimed in claim 1, wherein a phase between switching of switches in the first switching circuit and switching of switches in the second switching circuit is adjustable so as to control a power transfer in a first direction and a second direction of the bi-directional DC-DC power converter.

7. The bi-directional DC-DC power converter of claim 1, wherein the isolation barrier includes a second transformer.

* * * * *